March 25, 1958  R. FORMAN ET AL  2,828,396
MAGNETORESISTIVE DEVICE
Filed Oct. 6, 1954  2 Sheets-Sheet 1
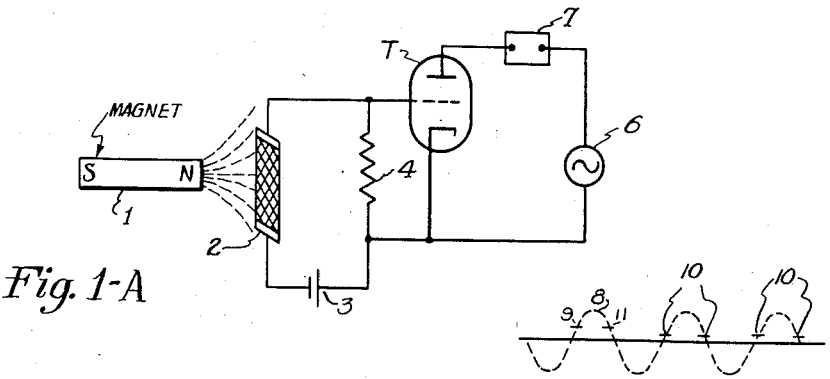
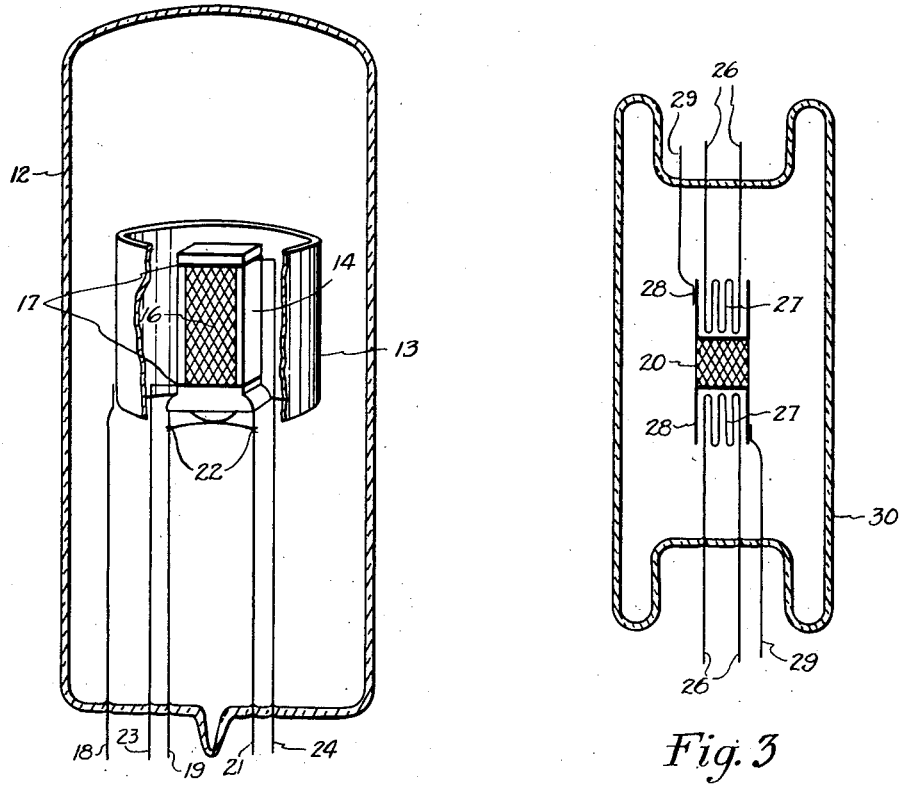
INVENTOR
Ralph Forman
Robert G. Breckenridge
BY Arthur Vinograd
ATTORNEY March 25, 1958 R. FORMAN ET AL 2,828,396
MAGNETORESISTIVE DEVICE
Filed Oct. 6, 1954 2 Sheets-Sheet 2

INVENTOR
Ralph Forman
Robert G. Breckenridge
BY Arthur Vinograd
ATTORNEY

_United States Patent Office_

2,828,396
Patented Mar. 25, 1958

2,828,396

MAGNETORESISTIVE DEVICE

Ralph Forman, Hyattsville, and Robert G. Breckenridge, Bethesda, Md., assignors to the United States of America as represented by the Secretary of Commerce Application October 6, 1954, Serial No. 460,778

7 Claims. (Cl. 201—63)

The present invention relates to variable resistance devices and more particularly to materials the resistance of which varies in accordance with the strength and orientation of a magnetic field applied to the material.

All materials possess to a greater or lesser degree the property of resistance which varies under the influence of a magnetic field. However, a few materials which exhibit this property to a marked degree have come to be generally termed magnetoresistive materials. As such they have a very wide utility in the field of electronics being used in various bridge circuits, control circuits, as switches and even as amplifiers and oscillators.

At the present time magnetoresistive materials of the prior art have had the serious drawback that the resistivity of the material, while indeed affected by magnetic fields, does not vary more than in the order of about ten percent from its normal value. Thus while having a tremendous potential value, magnetoresistive materials have not been as widely utilized as they might have been.

Applicant in testing oxide cathodes discovered that a mixture of barium and strontium oxides, in the usual proportions used to make an oxide cathode, exhibited a marked variation in resistivity when subjected to a transverse magnetic field. The oxide cathode possesses this property because it is a good thermionic emitter and is also a porous semiconductor. Observations indicate that thoria and other rare earth oxides also have these properties and show large magnetoresistive effects.

It is therefore an object of this invention to provide a new magnetoresistive material.

Another object of this invention is to provide a switching circuit utilizing a magnetoresistive element.

Still another object of this invention is to provide metallic oxides the resistance of which varies under the influence of a magnetic field.

A further object of this invention is to provide a novel type amplifier utilizing applicant's magnetoresistive material.

In the drawings:

Fig. 1a shows a simple triggering circuit employing the device of the present invention;

Fig. 1b is a diagram illustrating the switching action of the circuit of Fig. 1a;

Fig. 2 shows one embodiment of the present invention;

Fig. 3 shows another embodiment of the present invention;

Figure 4:
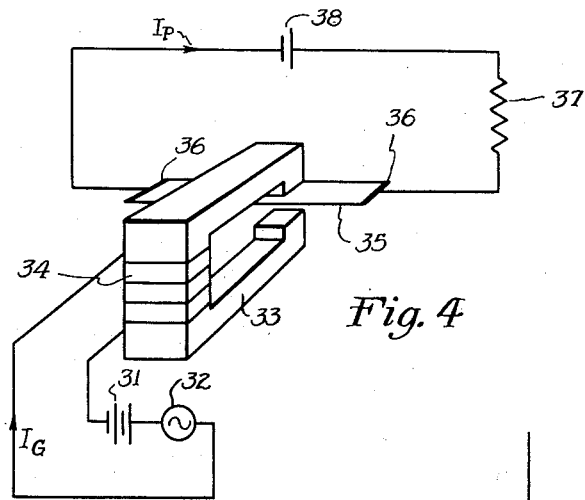
Fig. 4 shows a novel amplifier utilizing the magnetoresistive material of the present invention.

Referring to the drawings Fig. 1a shows a simple triggering circuit utilizing applicant's magnetoresistive material. At 1 is shown a magnet for setting up a magnetic field around the magnetoresistive element 2. For purposes of illustration magnet 1 is shown as a small permanent magnet but it should be appreciated that any type of instrument capable of establishing a magnetic field about magnetoresistor 2 would be satisfactory. Bias battery 3 supplies a slight negative bias to the grid of thyratron tube T through magnetoresistor 2 maintaining the thyratron normally cut off.

Grid resistor 4 in series with magnetoresistor 2 serves as a potential divider resistor for the voltage from bias source 3. Any change in resistance of magnetoresistor 2 is felt as a change in potential at the grid of thyratron tube T.

The plate voltage for thyratron T is provided by A.-C. source 6 connected across the plate and cathode of the tube. The instrument to be energized 7 is connected in series with the A.-C. plate voltage source 6 and the plate cathode circuit of thyratron T. For the purposes of display, applicant has constructed a model of the circuit of Fig. 1 in which the instrument to be energized 7 is an ordinary electric light bulb.

With no magnetic field applied to magnetoresistor 2 the bulb 7 remains unenergized and does not light. Upon bringing the magnet 1 close to element 2 its resistance greatly increases thus reducing the negative bias on the grid of tube T causing it to fire. With the A.-C. circuit closed bulb 7 is energized and lights up.

As shown in Fig. 1b the A.-C. voltage is represented by the sine wave 8. With the reduced negative bias on its grid, thyratron tube T fires when the plate voltage reaches point 9 and conducts over the portion of the plate supply voltage cycle from point 9 to point 11 where it reaches plate cut-off.

It is therefore possible to vary the brightness of light bulb 7 by slightly moving magnet 1. As the resistance of magnetoresistor 2 increases due to the closer approach of magnet 1 the bias on the grid of the thyratron becomes less negative. The result is that the tube will conduct with less plate voltage applied and thus the bulb 7 is energized over a greater portion of the A.-C. plate voltage cycle as shown at 10. This longer period of energization appears to an observer as a more intensive light from the filament of bulb 7.

Fig. 2 shows one embodiment of the magnetoresistor 2 of Fig. 1. The evacuated glass tube envelope 12 surrounds the entire device providing a vacuum and serving to protect the oxide coating from the atmosphere. Element 13 shown cut away is a cylindrical heat shield of "advance" metal such as a non-magnetic nickel-copper alloy. Enclosed within heat shield 13 is a magnesium oxide electrical insulating body 14 on which the magnetoresistive oxide coating 16 is deposited. Body 14 is constructed in the form of a solid block with its two large opposed surfaces coated with the referred to magnetoresistive metallic oxide deposit 16. The strips indicated at 17 are metalceramic patches brazed to the magnesium block 14 which pass completely around the block and serve as electrical conductors for connecting the two oxide coatings 16 together. Leads 23 and 24 are each connected to one of the patches 17 and serve as means to connect magnetoresistor 2 to an external circuit.

Lead 18 serves as a supporting lead for the heat shield 13 while leads 19 and 21 are connected to the heater supply. As is shown leads 19 and 21 supply heater current to tungsten heater filament 22 which serves to heat the oxide coatings 16. Leads 19 and 21 may be connected to filament wire 22 by any convenient method, preferably by welding.

In operation the filament leads 19 and 21 are supplied with energy until the tungsten wire 22 heats the oxide coatings 16 to a temperature of from 600 to 700 degrees centigrade. If a magnetic field is then applied perpendicular to the planes of oxide coatings 16 the resistance as measured between leads 23 and 24 increases in the order of 200 percent, the exact increase depending upon the original density of the coating and more directly on the strength of the magnetic field.

The magnetoresistive oxide coating of the present invention must be a good thermionic emitter and must be prepared so that it has the properties of a porous semiconductor. Barium-strontium oxide has been found particularly suitable while thorium oxide as well as some of the rare-earth oxides also exhibit such properties.

As has been previously noted the magnetic field in order to have an effect on the oxide coating must be applied perpendicularly to the plane of the coating. As the magnet 1 is moved in a semicircular path around magnetoresistor 2 its effect on magnetoresistor 2 rapidly diminishes.

It is believed that the explanation for the behavior of the material is as follows. The barium-strontium oxide coating is an excellent thermionic emitter at high temperatures and in addition is a porous semiconductor. At high temperatures electrons are emitted from the material into the porous regions enclosed within the coating structure and these electrons form an electron gas in the pores. When an electric field is applied to the substance, the resulting conductive current is carried by this electron gas.

If a magnetic field is applied to the material simultaneously with the applied electrical field and perpendicular to it the flowing electrons follow a trochoidal path in the pores.

At high temperatures, the electrons are emitted into the porous regions with varying velocities ranging from fairly low velocities to quite high ones. The high velocity electrons traveling in the direction of the applied electric field contribute to the conduction current through the material. However, the low velocity electrons under the influence of the crossed electric and magnetic fields are forced to complete more of the trochoidal path and tend to spiral out of the porous regions. These slower electrons therefore do not contribute to the conduction current.

As the magnetic field is increased electrons with higher and higher initial velocities are caused to spiral out and there will be fewer electrons having a velocity sufficient to carry them across a pore or cavity in the material. As a result, the total number of electrons flowing in the direction of the applied electric field is decreased. This in effect increases the resistance of the material in the direction of the applied electric field. Because the physical dimensions of the pores determine the mean free path of the electrons, a quite porous material is chosen thereby providing a large mean free path. With a longer mean free path the magnetoresistive effect is produced by a weaker magnetic field than would be necessary if the mean free path were shorter.

The reduction in current for an equivalent potential constitutes an effective increase in the resistance of the material proportional to the perpendicular magnetic field applied. Applicants' invention appears to be quite sensitive to both the magnitude and direction of the external magnetic field, since, in the circuit shown in Fig. 1, it has been observed that a very slight movement of the magnet 1 is enough to turn the bulb 7 on or off.

The embodiment of Fig. 2 provides a magnetoresistor with relatively low current characteristics presenting a comparatively high resistance across leads 23 and 24.

Fig. 3 illustrates a second embodiment of applicants' invention having relatively high current characteristics.

At 26 are shown the heater leads for heating the tungsten filaments 27. The filaments 27 are enclosed inside two nickel cylindrical caps 28 between which the metallic oxide coating 20 is firmly pressed. Electrical connection is made to the caps 28 by means of leads 29 which may be attached to the caps 28 in any conventional manner, preferably by welding. The entire device is enclosed in an evacuated glass envelope 30. The embodiment shown in Fig. 3 may be employed in a circuit such as that shown in Fig. 1a as well as various other circuits requiring a magnetoresistor which presents smaller series resistance while passing a relatively large current.

Fig. 4 shows an embodiment of the invention employed as an amplifier. Electromagnet 33 is placed around a device containing oxide cathode coating 35 similar in construction to the element described in either Figs. 2 or 3. Electrical contacts to the coating 35 are indicated at 36. Current to the coating is supplied by battery 38 through the load resistance shown at 37. Coil 34 which controls the magnetic field of magnet 33 is biased to provide a constant magnetic field by means of battery 31. A variable voltage source, shown at 32, is also provided to control the current $I_g$ through coil 34. The current $I_p$ through load 37 is dependent upon the resistance in series with battery 38. Since the resistance of magnetoresistor 35 varies with the magnetic field applied by magnet 33 an A. C. signal from source 32 applied to magnet 22 through winding 34 is reproduced across load 37.

Figure 5:
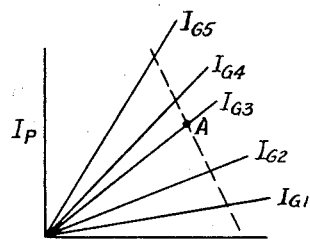
Fig. 5 is a plot of the characteristic curves of the amplifier of Fig. 4.

Fig. 5 shows the characteristic curves for the amplifier. The current through the device is plotted as a function of voltage across the device with the magnetic field (determined by value of $I_g$) as the variable parameter. If the batteries 31 and 38 are adjusted to give a current $I_p$ corresponding to A in Fig. 5, then a variation in source 32 causes the characteristic point to move as shown by the dashed line in Fig. 5. If the magnetic core material, gap spacing, and number of turns are chosen so that $\Delta I_g \, \Delta I_p$ the device of Fig. 4 will provide current amplification.

While a number of particular applications in the form of specific embodiments have been shown and described, it is apparent from the disclosure that the present invention involves principles which may be generally applied in situations where the disclosed singular magnetoresistive characteristics would prove efficacious. It is therefore not intended to limit the invention to any particular structural embodiment except as defined in the appended claims.

What is claimed is:

1. A magnetoresistor comprising an evacuated envelope, a thermionic emitting porous semiconductive metallic oxide coating supported in said envelope, means for heating said coating to a temperature of between 600 and 700 degrees centigrade, means for establishing an electric current through said coating and means for subjecting said coating to a variable magnetic field.

2. A magnetoresistor comprising an evacuated envelope, a block of ceramic insulating material within said envelope, a heat shield surrounding said ceramic block, a porous semiconductive metallic oxide coating selected from the group consisting of barium-strontium oxide and thorium oxide on said ceramic block, means for heating said coating to a temperature of between 600 and 700 degrees centigrade, means for establishing an electric current through said coating, and means for subjecting said coating to a variable magnetic field.

3. A magnetoresistor comprising an evacuated envelope, a ceramic insulating element within said envelope, a thermionic emitting porous semiconductive metallic oxide coating on said ceramic element, means for heating said coating and means connected directly to said coating for passing an electric current therethrough.

4. A magnetoresistor comprising an evacuated envelope, a ceramic insulating element within said envelope, a thermionic emitting porous semiconductive metallic oxide coating on said ceramic element, means for heating said coating to a temperature above 600° centigrade and means connected directly to said coating for passing an electric current therethrough.

5. A magnetoresistor comprising an evacuated envelope, a ceramic insulating element within said envelope, a thermionic emitting porous semiconductive metallic oxide coating on said ceramic element, means for heating said coating to a temperature of between 600 and 700° centigrade, means connected directly to said coating for passing an electric current therethrough and means for subjecting said coating to a variable magnetic field.

6. A magnetoresistor comprising an evacuated envelope, a pair of adjacent metallic caps having facing flat surfaces within said envelope, a thermionic emitting porous semiconductive metallic oxide pressed between said surfaces, means for heating said oxide to a temperature of between 600 and 700° centigrade, and means for passing an electric current through said oxide.

7. A magnetoresistor comprising an evacuated envelope, a block of ceramic insulating material within said envelope, a heat shield surrounding said ceramic block, a barium-strontium oxide coating on said ceramic block, means for heating said coating to a temperature of between 600 and 700° centigrade, means for establishing an electric current through said coating, and means for subjecting said coating to a variable magnetic field.

References Cited in the file of this patent

UNITED STATES PATENTS

| | | |
|---|---|---|
| 1,596,558 | Sokoloff | Aug. 17, 1926 |
| 1,790,540 | Hacklander | Jan. 27, 1931 |
| 1,810,539 | Sololoff | June 16, 1931 |
| 1,870,951 | Fredenburgh | Aug. 9, 1932 |
| 2,189,352 | Siegenheim | Feb. 6, 1940 |
| 2,226,847 | Clark | Dec. 31, 1940 |
| 2,487,581 | Palumbo | Nov. 8, 1949 |
| 2,500,953 | Libman | Mar. 21, 1950 |
| 2,528,113 | Carlson et al. | Oct. 31, 1950 |
| 2,553,603 | Peters | May 22, 1951 |
| 2,564,706 | Mochel | Aug. 21, 1951 |
| 2,620,466 | Hagen | Dec. 2, 1952 |
| 2,704,326 | Whitson et al. | Mar. 15, 1955 |
| 2,717,946 | Peck | Sept. 13, 1955 |